Patented Jan. 8, 1952

2,581,360

UNITED STATES PATENT OFFICE 2,581,360

METHOD OF STABILIZING POLYMERS COMPRISING VINYL OR VINYLIDENE CHLORIDES

John E. Costa and Otis Ray McIntire, Midland, Mich., assignors to The Dow Chemical Company, Midland, Mich., a corporation of Delaware No Drawing. Application March 11, 1950, Serial No. 149,207

2 Claims. (Cl. 260—45.7)

This invention relates to a method of stabilizing polymers comprising vinyl or vinylidene chlorides and particularly to such a method which will produce a polymeric composition having improved extrusion characteristics.

It is recognized that polymeric vinyl chloride, its copolymers, and vinylidene chloride copolymers generally require one or more protective agents to be present in their compositions if such polymeric substances are to be exposed to heat or light without undergoing decomposition. Thus, when such a polymeric product is to be extruded, it is necessary to incorporate in the plastic composition a material capable of minimizing the injurious effects of prolonged exposure to heat. Similarly, if the extruded product is one which would normally be exposed for prolonged periods to direct sunlight or equivalent radiation, it is highly desirable to incorporate in the composition, prior to extrusion, an agent which will give protection against the discoloring effect of such exposure to light. Among the various stabilizing agents which have been found useful are certain inorganic compounds including tetrasodium pyrophosphate, disodium orthophosphate, sodium phosphite, and the like. These and other known inorganic stabilizers, including some stabilizing pigments, have aided materially in preventing thermal degradation of polymeric bodies comprising vinyl or vinylidene chlorides, and in protecting them against the effects of light, but their presence in such a composition has created a problem which is particularly undesirable when the compositions are extruded.

It has been observed that, when a vinyl or vinylidene chloride polymer containing such a stabilizer as tetrasodium pyrophosphate is extruded in conventional manner to produce filamentary products, there soon begins to accumulate on the outer face of the extrusion orifice a hard and brittle ring-like structure which continues to build up as extrusion proceeds, and which becomes darkened due to the prolonged exposure of the polymer in that material to the high temperatures on the face of the extrusion die. It is observed that eventually the accretion of solid material around each orifice adheres to the material being extruded therethrough and, in breaking away from the die plate, forms irregularities known as "slubs" in the extruded filaments. Such imperfections must be cut from the filaments if the latter are to be used successfully in spinning, weaving or knitting operations. They not only alter the dimensions of the filament but also weaken it materially and are very unsightly. After further operation, the accretion of such material on the die face becomes so troublesome that it is necessary to discontinue the extrusion operation and to remove and clean the orifice plate before operations can be resumed. The troublesome factor mentioned above has been found to be due to the presence of the tetrasodium pyrophosphate or other inorganic stabilizers in the polymeric composition. At times the undesirable growth on the face of the die plate has been so rapid that it has been necessary to interrupt operations and to clean the plate as many as six or eight times in a single 8-hour shift.

Despite the disadvantages outlined above, it is still considered desirable to employ tetrasodium pyrophosphate or other inorganic stabilizers as protective constituents in polymeric compositions comprising significant amounts (10 per cent or more) of either vinyl or vinylidene chloride. It is accordingly an object of the present invention to provide a method whereby such stabilizers may be incorporated in a polymeric vinylidene chloride or vinyl chloride composition in such a manner that the stabilizing effect of the said agents is still obtained while the objectionable accretions on the face of the extrusion plate are avoided.

It has now been found that the foregoing and related objects may be obtained by employing a particular method for introducing tetrasodium pyrophosphate or other water-soluble and normally solid inorganic stabilizers into the polymeric composition. According to the present invention the desired results are obtained by mixing intimately in an evaporative atmosphere a stream of a concentrated aqueous solution of a normally solid, water-soluble inorganic stabilizer for vinyl or vinylidene chloride polymers with a stream of an aqueous latex-like dispersion of the polymer to be stabilized, at a rate to provide from 5 to 40 parts by weight of the stabilizer and correspondingly from 95 to 60 parts of the polymer per unit time, flashing water vapor from the so-mixed streams, recovering the spray-dried stabilizer concentrate, and blending this concentrate intimately with additional powdered polymer in a proportion to provide from 0.1 to 2 per cent of the stabilizer in the final mixture. The resulting mixture, though of the same average analysis as that which has heretofore given trouble in extrusion operations may be extruded continuously for from 4 to 8 times as long without interruptions for cleaning the die face as can the product of the normal dry-blending procedure heretofore used.

In a specific example, a 5 per cent aqueous solution of tetrasodium pyrophosphate was fed through a spray nozzle into a small spray dryer at the rate of 12 pounds per hour while an aqueous latex-like dispersion obtained by the emulsion polymerization of a mixture of 85 per cent vinylidene chloride and 15 per cent vinyl chloride, containing 30 per cent by weight of solid copolymer in the latex, was fed at the rate of 6 pounds per hour into the same dryer through a separate nozzle so positioned that the two spray patterns from the two nozzles became intimately mixed. The air being fed to the dryer for evaporative purposes was preheated to 150° C., and the temperature in the drying zone was thereby kept at 80° C. The dried polymer powder containing the dried stabilizer was carried out of the dryer in the exhaust air stream at 72° C., at the rate of 2.7 pounds per hour. The so-formed powdered concentrate contained about 25 per cent of the stabilizer by weight, and was blended with additional but unstabilized powdered copolymer of 85 per cent vinylidene chloride and 15 per cent vinyl chloride in a ratio of 10 pounds of concentrate to 240 pounds of unstabilized polymer, to yield a stabilized product containing 1 per cent of the stabilizer. When this final blend was extruded in filamentary form, the operation did not need to be interrupted to clean the die plate and to remove decomposed and troublesome accretions therefrom, for over 6 hours. In contrast thereto, when a conventional dry-blended mixture of 1 per cent of the same stabilizer in the same polymer was extruded from the same apparatus at the same temperature and at the same rate, the accretions on the die face became very objectionable and required cleaning after only 1 hour. When molded samples of the dry-blended product were exposed to the radiations of a "Fadeometer," they turned a distinct brown tint in from 20 to 40 hours, while the product made by the present method, when molded and tested the same way did not become discolored to the same extent until 80 to 100 hours had elapsed.

While the preparation of the concentrate described herein requires that the polymeric composition for use in the concentrate be prepared by the emulsion method, it is not necessary that the larger amount of polymeric substance with which the concentrate is blended later be prepared in this way.

The advantages of the present invention have been noted with copolymers of vinylidene chloride and vinyl chloride in all proportions, and with polyvinyl chloride, as well as with other copolymers in which there are significant amounts (10 per cent, or more) of either vinyl chloride or vinylidene chloride.

We claim:
1. The method which comprises mixing intimately in an evaporative atmosphere a stream of an aqueous latex-like dispersion of a polymer which contains at least 10 per cent of a member selected from the group consisting of vinyl chloride and vinylidene chloride polymerized therein, with a stream of an aqueous solution of a normally solid, water-soluble inorganic stabilizer for such polymer, the said streams being supplied at rates to provide from 5 to 40 parts by weight of the stabilizer while correspondingly from 95 to 60 parts of the polymer are being supplied, flashing water vapor from the so-mixed streams, recovering the spray-dried concentrate of stabilizer in polymer, and blending this concentrate intimately with additional powdered polymer in a proportion to provide from 0.1 to 2 per cent of the stabilizer in the final mixture.

2. The method as claimed in claim 1, wherein the stabilizer is tetrasodium pyrophosphate and the polymer being stabilized is a copolymer of vinylidene chloride and vinyl chloride.

JOHN E. COSTA.
OTIS RAY McINTIRE.

REFERENCES CITED

The following references are of record in the file of this patent:

UNITED STATES PATENTS

| Number | Name | Date |
|---|---|---|
| 1,988,483 | Croakman | Jan. 22, 1935 |
| 2,109,592 | Macht et al. | Mar. 1, 1938 |
| 2,477,611 | Irons | Aug. 2, 1949 |